Sept. 3, 1968 | FUMIYUKI INOSE | 3,400,333

MULTIPLIER

Filed Nov. 24, 1964

INVENTOR.
Fumiyuki Inose

BY

H. Edward Mostern

United States Patent Office 3,400,333
Patented Sept. 3, 1968

3,400,333
MULTIPLIER

Fumiyuki Inose, Hachioji-shi, Japan, assignor to Kabushiki Kaisha Hitachi Seisakusho, Tokyo-to, Japan, a joint-stock company of Japan Continuation-in-part of application Ser. No. 206,730, July 2, 1962. This application Nov. 24, 1964, Ser. No. 413,469
Claims priority, application Japan, July 1, 1961, 36/23,647
2 Claims. (Cl. 328—160)

ABSTRACT OF THE DISCLOSURE

A multiplier furnished with two input signals for the generation of one output signal proportional to the two input signals. One input signal is applied to both terminals of a series circuit of a resistor and two capacitors each connected in parallel with a switch, and another input signal is converted into a frequency signal by a converter. Such a converted signal is applied to the switches coupled in parallel with said two capacitors so as to perform on and off operations in opposite relation to each other, whereby a current flowing through said resistor is varied in proportion to the product of the fequency of said frequency signal and a voltage magnitude of the first mentioned input signal.

Figure 1:
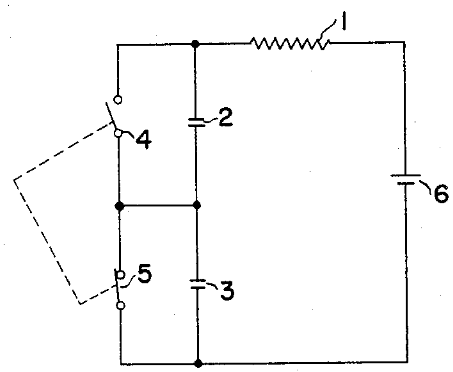

This application is a continuation-in-part of prior application Ser. No. 206,730, filed July 2, 1962, in the name of Fumiyuki Inoise, entitled "Multiplier" and now abandoned.

This invention relates to computers, and more particularly it relates to a new multiplier of relatively simple construction having highly desirable features.

For systems of the type in which analog signals $x$ and $y$ are introduced as input signals, and the product $x \cdot y$ is to be obtained as the output, various systems have heretofore been proposed. Examples of such proposals are: the time-division system wherein one of the input signals, for example, $x$, is shut off by means of a switch, and the on-period and the off-period are controlled in correlation to the other input signal $y$; and the servo-multiplier system wherein a divide ratio which is proportional to one of the input signals, for example, $x$, is obtained by means of a gang potentiometer. However, the construction of each of these systems when reduced to practice have, hitherto, been complicated and of large size.

It is an object of the present invention to provide a new multiplier in which such disadvantages of conventional apparatus as above-described are eliminated.

It is another object to provide a multiplier as stated above which has a relatively simple construction and is of small, convenient size.

It is a further object to provide a multiplier as stated above which requires no mechanical mechanisms whatsoever and is highly reliable and stable.

Figure 2:
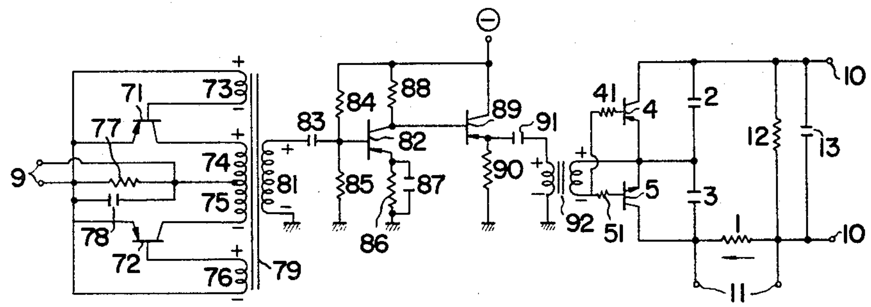

The nature, principle, and details of the invention will become more apparent by reference to the following description when taken in conjunction with the accompanying drawing in which like parts are designated by like reference numerals, and in which:

FIG. 1 is a simplified circuit diagram for explaining the principle of the multiplier of this invention; and FIG. 2 is a circuit diagram showing a representative embodiment of the multiplier according to the present invention.

The circuit shown in FIG. 1 comprises a resistor 1 of a resistance value R, capacitors 2 and 3 of capacitance C, choppers 4 and 5 which carry out mutually out-phase, on-off operation, and a direct-current power supply 6 connected as shown. In this circuit, if the time constant RC is sufficiently smaller than the on-off period of the choppers 4 and 5, the current flowing through the resistor 1, or the voltage across the terminals of the said resistor 1, will be directly proportional to the on-off frequency.

That is, under the above-stated condition, the voltage $E_R$ across the terminals of the resistor R is expressed by the following equation. $E_R = E \cdot 2fRC$ (where: f is the exciting frequency of the choppers and E is the direct-current power supply voltage.)

The significant indication of the above equation is that the voltage $E_R$ is proportional to the exciting frequency $f$ of the choppers 4 and 5 and, at the same time, is also proportional to the magnitude of the direct-current power supply voltage E.

In view of the above relationship, the present invention provides means whereby one analog signal, for example, $y$, is substituted for the power supply 6, and, at the same time, the on-off operations of the choppers are controlled through the other signal $x$ so as to obtain a voltage $x \cdot y$ produced across the terminals of the aforesaid resistor 1.

A representative embodiment of the present invention is shown in FIG. 2, wherein the parts designated by reference numerals 1 through 5, inclusive, indicate the same construction as that shown in FIG. 1. In place of the power supply 6 of FIG. 1, input terminals 10 for one of the analog signal are provided. Another input terminal 9 for the other analog signal is connected to a voltage-to-frequency converter 7 consisting of a circuit known as a so-called Loyer's circuit (vide U.S. Patent No. 2,783,-384), the output side of which is connected to an amplifier 8. The output side of the amplifier 8 is connected to the junction between two switching elements by way of a transformer 92. Output terminals 11 are connected to the two ends of an output resistor 1.

In the said voltage-frequency converter 7, the reference numerals 71 and 72 are transistors of a PNP type, and between the emitter and base of the said respective transistor windings 73 and 76 are connected. Also, between the emitter and collector of the said respective transistors 71 and 72 windings 74 and 75, respectively, are connected through a parallel circuit of a resistor 77 and a capacitor 78. The said windings 73, 74, 75 and 76 are all wound around a core 79 having a rectangular hysteresis characteristic. The winding direction of the respective windings 73–76 is made in such a direction that the polarity of voltage may come out as illustrated in the drawing. One of the analog signals, for example, $x$ is impressed between both terminals of the said resistor 77. In the circuit thus constructed, the transistors 71 and 72 repeat on and off operations alternately whereby a rectangular wave output is produced in an output winding 81 wound around the core 79. Here, when the voltage of the analog signal $x$ impressed on the input terminal 9 is made $E_x$, the frequency $f$ of the said rectangular wave is represented by the following relationship $$f = \frac{E_x}{4N\phi_s} \quad (1)$$

where N denotes each winding of the windings 73, 74, 75 and 76 and $\phi_s$ expresses saturated magnetic flux of the core 79.

In the above equation, since N and $\phi_s$ are constant, the output frequency $f$ becomes proportional to the voltage $E_x$ of the input analog signal $x$. Thus, a signal of frequency $f$ converted into alternating current, is impressed on the amplifier 8 through a coupling capacitor 83. This amplifier 8 consists of PNP type transistors 82 and 89 arranged in two stages. Resistors 84, 85 and 86 are used for biasing the transistor 82 and a side capacitor 87 is provided for maintaining alternately the emitter of the transistor 82 at the zero electric potential or in its vicinity.

The emitter of the second stage transistor 89 is connected with a resistor 90 and voltage across the terminals of the resistor 90 is applied to a transformer 92 through a coupling capacitor 91. 4 and 5 are transistors which perform switching operations and are formed with transistors of different conductivity types. In this drawings, the switch 4 is of PNP type and the switch 5 is of NPN type. The base electrodes of the switching transistors 4 and 5 are connected to one of the terminals of the secondary winding of a transformer 92 through respective resistors 41 and 51 for restricting current flow. Capacitors 2 and 3 are directly connected each other at one of the terminals and its junction is further connected with the emitters of the switching transistors 4 and 5. The other terminals of the said capacitors 2 and 3 are connected, respectively, with the collectors of the said switching elements 4 and 5. The other analog signal *y* is impressed on the terminals 10 and then applied to both ends of a resistor 12 after its high frequency noise is removed by a capacitor 13. The output voltage is taken out across the terminals of the output resistor 1.

In the abovementioned circuit arrangement, the switching elements 4 and 5 have different conductivity types of PNP and NPN. However, in case the said switching transistors are all of the same type such as, for example, PNP type, the said transformer 92 may be provided with two numbers of secondary windings, each of which is connected with the respective transistors so that the polarity of voltage to be generated in the said respective windings may become reverse with respect to the bases of the respective switching transistors, whereby it becomes possible to cause the switching elements to perform on and off operations alternately.

The actual operation of the circuit shown in FIG. 2 is explained hereinbelow.

The rectangular wave generated in the voltage-frequency converter 7 is amplified by the amplifier 8 and then is applied to the transformer 92. Now, when the voltage generated in the secondary winding of the transformer 92 has such polarity as shown in the drawing, negative voltage is impressed on the base of the said PNP type transistor 4 with respect to its emitter. On account of this, when the voltage is sufficiently large to saturate the said transistor 4, it is in the on-state and resistance between the emitter and collector of the transistor 4 indicates extremely small value. In the meantime, the said PNP type transistor 5 becomes off-state owing to its base having lower electric potential than its emitter with the result that resistance between the emitter and collector of the said transistor 5 shows extremely high value. When voltage having reverse polarity to that shown in the drawing is generated in the secondary winding, the transistor 4 becomes off-state and the transistor 5 becomes on-state. Thus, in accordance with polarity of rectangular wave (exciting signal) to be generated in the secondary winding of the transformer 92, the switching transistors 4 and 5 repeat on and off operations alternately. Now, assuming that the transistor 4 is in on-state and the transistor 5 is in off-state, charging electric current flows through the resistor 1, the capacitor 3 and the transistor 4 by the voltage impressed on the terminals 10. When the transistor 5 is in on-state and the transistor 4 is in off-state, the electric charge which has been charged in the capacitor 3 becomes discharged and charged electric current flows through the resistor 1, the transistor 5 and the capacitor 2. By on and off operations of the transistors 4 and 5, the abovementioned switching operations are repeated. In this case, electric current flows constantly in the output resistor 1 in the direction indicated by an arrow mark in the drawing, its value being represented by the following equation $$i(t)=\frac{E_y}{R}e^{-\frac{1}{RC}t} \quad (2)$$

where $E_y$ is voltage of the analog signal *y*; R is the resistance value of the output resistor 1; and C is capacitance of the capacitors 2 and 3. Accordingly, the voltage across the terminals of the resistor 1 becomes as follows:

$$e_0(t)=E_y e^{-\frac{1}{RC}t} \quad (3)$$

From the above equation, the average value of $E_0$ of voltage of $e_0(t)$ at the time of the transistors 4 and 5 performing on and off operations alternately at the frequency *f* is represented by the following equation.

$$E_0=\frac{1}{T}\int_0^T e_0(t)dt=2fCRE_y\left(1-e^{-\frac{1}{2fCR}}\right) \quad (4)$$

In the above equation, when the time constant of CR is made small enough, $$e^{-\frac{1}{2fCR}}\ll 1$$

and the average value $E_0$ becomes approximate to $2fCRE_y$, as follows.

$$E_0 \doteqdot 2fCRE_y \quad (5)$$

When the right side of the above Equation 5 is substituted by the Equation 1, it becomes $$E_0 \doteqdot \frac{CR}{2N\phi_s}\cdot E_x \cdot E_y = KE_xE_y \quad (6)$$

where:

$$K=\frac{CR}{2N\phi_s}$$

From the above Equation 6, it is seen that the output voltage $E_0$ is proportional to the product of input analog signals *x* and *y* and the respective voltages $E_x$ and $E_y$ thereof.

As will be apparent from the foregoing description, the multiplier according to the present invention has a relatively simple construction and can be made to be of small size. Moreover, this multiplier requires no mechanical mechanisms whatsoever and has high reliability and stability.

Although this invention has been described with respect to a particular embodiment thereof, it is not to be so limited as changes and modifications can be made therein which are within the full intended scope of the invention, as defined by the appended claims.

What I claim is:

1. A multiplier supplied with two input signals for generating one input signal proportional to the product of the two input signals which comprises:

- a sereis circuit of capacitor means and resistors means;
- a switching means connected in parallel with said capacitor means;
- means for supplying a first input signal between both ends of said series circuit;
- a second input means;
- means for operatively converting an input signal applied thereto into a frequency signal, the frequency of which is in proportion to the magnitude of the applied input shignal;
- means for supplying a second input signal to said converting means;
- means for applying said frequency signal of the converting means to said switching means so as to allow the same to perform periodical opening and closing operations, the cycle of the alternate switching operation of said switching means being in proportion to the frequency of said frequency signal; and
- output means for obtaining an output signal proportidnal to the product of the two input signals between both ends of said resistor means.

2. A multiplier supplied with two input signals for generating one output signal proportional to the product of the two input signals which comprises:

a series circuit of two capacitors and a resistor;

a pair of switching means each connected in parallel with said capacitors;

a first input means for supplying a first input signal between both ends of said series circuit;

means for operatingly converting an input signal applied thereto into a frequency signal, the frequency of which is in proportion to the magnitude of the applied input signal;

a second input means for supplying a second input signal to said converting means;

means for applying said frequency signal to each of said switching means so as to allow the same to perform periodical opening and closing operations in opposite relation to each other, the cycle of the operation of each of said switching means being proportional to said frequency of the frequency signal; and output means for obtaining an output signal proportional to the product of said first and second input signals from between both ends of said resistor.

References Cited

UNITED STATES PATENTS 3,309,510 3/1967 Brown ---------- 307—88.5 X

JOHN S. HEYMAN, *Primary Examiner.*